(12) United States Patent
Yamada et al.

(10) Patent No.: US 7,289,141 B2
(45) Date of Patent: Oct. 30, 2007

(54) IMAGE SUPPLY DEVICE, RECORDING APPARATUS, RECORDING SYSTEM, AND CONTROL METHOD THEREFOR

(75) Inventors: Akitoshi Yamada, Yokohama (JP); Kazuya Sakamoto, Yokohama (JP); Takao Aichi, Tokyo (JP); Kentaro Yano, Yokohama (JP); Kazuyuki Masumoto, Yokohama (JP); Fumihiro Goto, Kawasaki (JP); Ruriko Mikami, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/541,381

(22) PCT Filed: Jan. 29, 2004

(86) PCT No.: PCT/JP2004/000804

§ 371 (c)(1),
(2), (4) Date: Jul. 1, 2005

(87) PCT Pub. No.: WO2004/068334

PCT Pub. Date: Aug. 12, 2004

(65) Prior Publication Data

US 2006/0072895 A1    Apr. 6, 2006

(30) Foreign Application Priority Data

Jan. 31, 2003  (JP)  ............ 2003-024543
Jan. 15, 2004  (JP)  ............ 2004-008400

(51) Int. Cl.
*H04N 5/225* (2006.01)

(52) U.S. Cl. ............... 348/207.2; 348/211.1

(58) Field of Classification Search ........ 348/207.1, 348/207.2, 211.99, 211.1, 211.3, 211.4; 386/38, 386/117, 119; 370/229, 235, 236; 710/17–19, 710/29
See application file for complete search history.

(56) References Cited

U.S. PATENT DOCUMENTS 5,541,656 A * 7/1996 Kare et al. ............ 348/333.02
(Continued)

FOREIGN PATENT DOCUMENTS

CA    2235567    10/1998
(Continued)

OTHER PUBLICATIONS

Photographic and Imaging Manufacturing Association, Inc., PIMA 15740:2000, Approved Jul. 5, 2000, 1st Edition, "Photography—Electronic Still Picture Imaging—Picture Transport Protocol (PTP) for Digital Still Photography Devices" (2000).*
(Continued)

*Primary Examiner*—Lin Ye
*Assistant Examiner*—Timothy J Henn
(74) *Attorney, Agent, or Firm*—Fitzpatrick, Cella, Harper & Scinto

(57) ABSTRACT

In a recording system in which a DSC and PD printer are directly connected via a communication interface, and image data is transmitted from the DSC to the PD printer and recorded, it is determined whether predetermined status information is received from the PD printer within a predetermined time period after the DSC issues a predetermined command to the PD printer. If it is determined that the predetermined status information is not received, the status is determined to be one estimated from a normal process, and a process continues. To confirm the status of the PD printer, the DSC requests status information of the PD printer, and acquires the status of the PD printer on the basis of the status information sent back in response to the request.

14 Claims, 15 Drawing Sheets

U.S. PATENT DOCUMENTS

| | | | |
|---|---|---|---|
| 6,055,361 A * | 4/2000 | Fujita et al. | 358/1.15 |
| 6,298,405 B1 | 10/2001 | Ito et al. | 710/107 |
| 2001/0048534 A1* | 12/2001 | Tanaka et al. | 358/1.16 |
| 2002/0060810 A1 | 5/2002 | Shiraiwa | 358/1.16 |
| 2002/0089688 A1 | 7/2002 | Ferlitsch et al. | 358/1.15 |
| 2003/0067620 A1 | 4/2003 | Masumoto et al. | 358/1.13 |
| 2003/0156196 A1 | 8/2003 | Kato et al. | 348/207.2 |
| 2004/0021902 A1 | 2/2004 | Ogiwara et al. | 358/1.15 |
| 2004/0046990 A1 | 3/2004 | Yano et al. | 358/1.15 |
| 2004/0070672 A1 | 4/2004 | Iwami et al. | 348/207.2 |
| 2004/0252335 A1 | 12/2004 | Yano et al. | 358/1.15 |

FOREIGN PATENT DOCUMENTS

| | | |
|---|---|---|
| EP | 0 874 519 A2 | 10/1998 |
| EP | 938218 A2 * | 8/1999 |
| JP | 10-229538 | 8/1998 |
| JP | 11-7701 | 1/1999 |
| JP | 2001-290612 | 10/2001 |
| JP | 2002-019235 | 1/2002 |
| JP | 2002-19235 | 1/2002 |
| JP | 2002-63129 | 2/2002 |
| JP | 2003-341183 | 12/2003 |
| RU | 2187146 C2 | 8/2002 |

OTHER PUBLICATIONS

White Paper of CIPA DC-001-2003, Digital Photo Solutions for Imaging Devices, Camera & Imaging Products Association, Feb. 3, 2003.

Photographic and Imaging Manufacturers Association, Inc., PIMA 15740:2000, Approved Jul. 5, 2000, 1st Edition, "Photography—Electronic Still Picture Imaging—Picture Transport Protocol (PTP) for Digital Still Photography Devices" (2000).

Apr. 6, 2004 International Search Report in PCT/JP2004/000856.

Apr. 6, 2004 International Search Report in PCT/JP2004/000804.

Apr. 6, 2004 Written Opinion in PCT/JP2004/000804.

Russian Official Action with English Translation.

Apr. 16, 2007 Russian Notice of Allowance (with English Translation).

* cited by examiner

FIG. 7

```
<startJob>
  <jobConfig>
    <quality>50000000</quality>                        — 700
    <paperSize>51060000</paperSize>                    — 701
    <paperType>52020000</paperType>                    — 702
    <fileType>53000000</fileType>                      — 703
    <datePrint>54010000</datePrint>                    — 704
    <fileNamePrint>55000000</fileNamePrint>            — 705
    <imageOptimize>56000000</imageOptimize>            — 706
    <fixedSize>58030000</fixedSize>                    — 707
    <cropping>59000000</cropping>                      — 708
  </jobConfig>
  <printInfo>
    <fileId>00000001</fileId>                          — 709
    <date>2002/10/28</date>                            — 710
  </printInfo>
</startJob>
```

720 → { 700–708 }
721 → { printInfo block }

FIG. 8A

| prtPID | ImagePath | copyID | progress | Image Printed |
|---|---|---|---|---|

FIG. 8B

| dpsPrint ServiceStatus | jobEnd Reason | error Status | error Reason | disconnect Enable | Capability Changed | newJobOK |
|---|---|---|---|---|---|---|

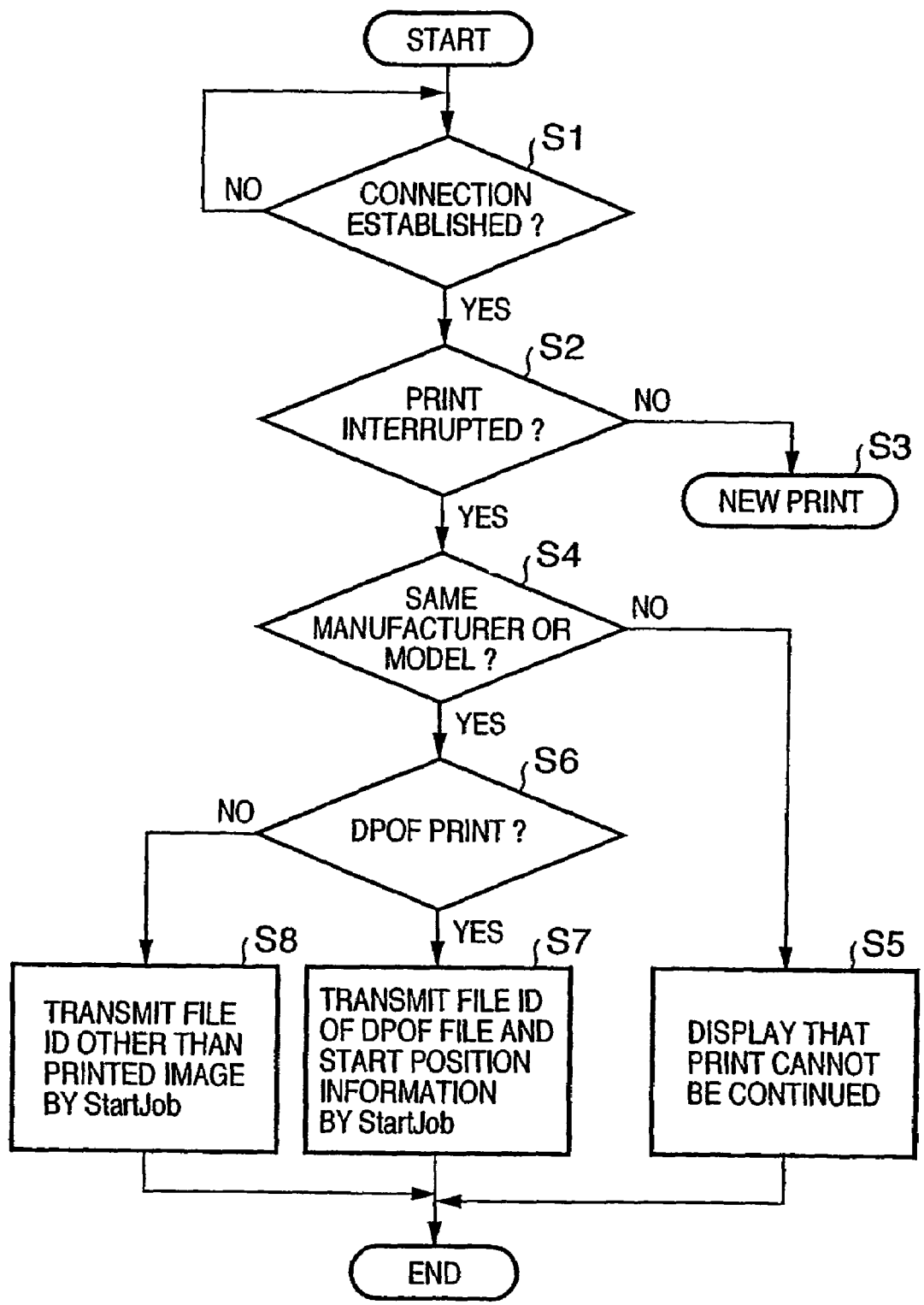

IMAGE SUPPLY DEVICE, RECORDING APPARATUS, RECORDING SYSTEM, AND CONTROL METHOD THEREFOR

TECHNICAL FIELD

The present invention relates to an image supply device such as a digital camera, a recording apparatus, a recording system, and a control method therefor.

BACKGROUND ART

In recent years, digital cameras (image sensing devices) which can sense images and convert them into digital image data by simple operations have been prevalent. When an image sensed by such camera is printed and used as a photo, it is a common practice to temporarily download the sensed digital image data from a digital camera to a PC (computer), execute an image process by the PC, and output the processed image data from the PC to a color printer, thus printing an image.

By contrast, for example, a color print system which allows a digital camera to directly transfer digital image data to a color printer without the intervention of any PC and can print it out, a so-called photo-direct (PD) printer in which a memory card that is mounted in a digital camera and stores sensed images can be directly mounted in the color printer and sensed images stored in the memory card can be printed have recently been developed.

Particularly, in order to directly transfer image data from a digital camera to a printer and print the image data, demands have arisen for standardization of interface specifications between a digital camera of each manufacturer and a printer, the operation method, and the like. One proposal for standardization is a guideline for realizing a DPS (Direct Print System).

However, a printer which directly receives image data from a digital camera and prints the image can also receive print data from a PC or the like in addition to the digital camera and print the data. For this reason, a response to a command from the digital camera may delay due to issuing of a print request from the PC when a pre-procedure for receiving image data between the printer and the digital camera is executed. For example, when a print start request is issued by the digital camera and received by the printer, a status representing that the next command can be accepted changes from "true" to "false", and the camera is notified of this status. If, however, e.g., a print request is simultaneously issued from a PC, the printer cannot quickly notify the camera of the status change. During this period, the camera may determine that the next command can also be accepted by the printer, and issue the command to the printer in spite of the printer being in busy state.

DISCLOSURE OF INVENTION

The present invention has been made in consideration of the above situation, and has a feature to provide an image supply device which, when a response coping with a procedure determined in advance between the image supply device and a recording apparatus is not received from the recording apparatus, determines that the status of the recording apparatus is a status estimated from a normal procedure, and decides subsequent process procedures, a recording apparatus, a recording system, and a control method therefor.

According to the present invention, there is provided with an image supply device used in a recording system in which the image supply device and a recording apparatus are directly connected via a communication interface, and image data is transmitted from the image supply device to the recording apparatus and recorded, characterized by comprising: reception means for receiving status information from the recording apparatus; determination means for determining whether said reception means has received predetermined status information from the recording apparatus within a predetermined time period after the image supply device issues a predetermined command to the recording apparatus; and process means for, in a case where the determination means determines that no predetermined status information has been received, determining a status as a status to be estimated from a normal process, and continuing a process.

According to the present invention, there is provided with a recording apparatus used in a recording system in which an image supply device and the recording apparatus communicate with each other via a communication interface, and image data is transmitted from the image supply device to the recording apparatus and recorded, characterized by comprising: command issuing means for issuing a predetermined command to the image supply device; reception means for receiving a signal from the image supply device after the command issuing means issues the predetermined command; determination means for determining whether the signal received by the reception means is a response corresponding to the predetermined command; and control means for controlling an issuing timing of a next command to the image supply device in a case where the determination means determines that the signal is not the response corresponding to the predetermined command.

Other features and advantages of the present invention will be apparent from the following descriptions taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the descriptions, serve to explain the principle of the invention.

FIG. 7 depicts a view for explaining an example of a print start command issued by the DSC according to the embodiment;

FIGS. 8A and 8B depict views for explaining JobStatus and DeviceStatus according to the embodiment;

FIG. 9 is a flow chart showing a print restart process by a DSC according to the first embodiment;

BEST MODE FOR CARRYING OUT THE INVENTION

Preferred embodiments of the present invention will now be described in detail below with reference to the accompanying drawings.

Figure 1:
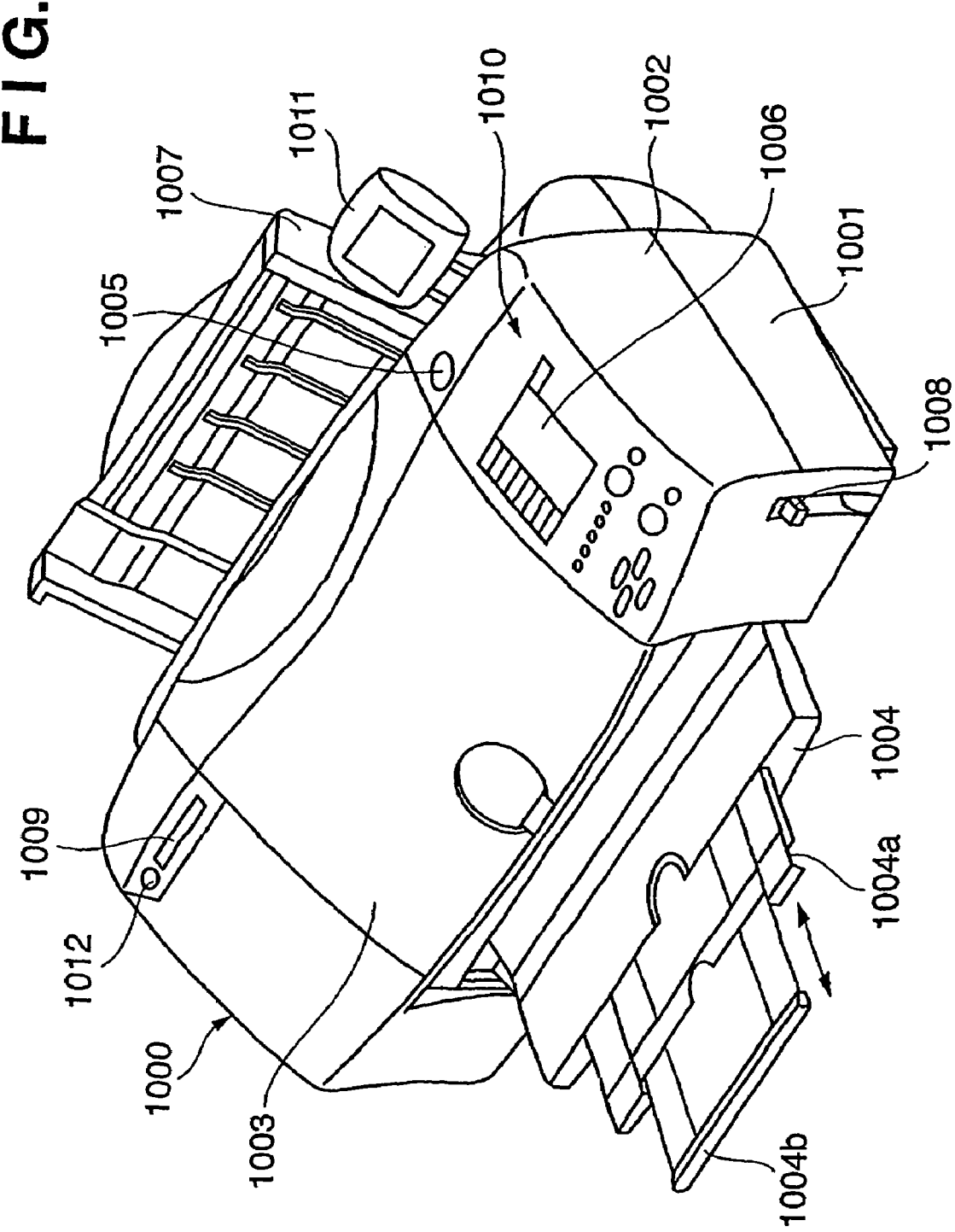
FIG. 1 depicts a schematic perspective view of a PD printer according to an embodiment of the present invention.

FIG. 1 depicts a schematic perspective view of a photo direct printer (to be referred to as a PD printer hereinafter) 1000 according to an embodiment of the present invention. The PD printer 1000 has a function of receiving data from a host computer (PC) and printing the data as a general PC printer, and a function of directly reading and printing image data stored in a storage medium such as a memory card, or receiving image data from a digital camera and printing the data.

Referring to FIG. 1, a main body which forms the housing of the PD printer 1000 according to the embodiment has a lower case 1001, upper case 1002, access cover 1003, and exhaust tray 1004 as exterior members. The lower case 1001 nearly forms the lower half portion of the PD printer 1000, and the upper case 1002 nearly forms the upper half portion of the main body. These cases are combined to form a hollow structure having a storage space which stores mechanisms (to be described later). Openings are respectively formed in the upper and front surfaces of the main body. One end of the exhaust tray 1004 is rotatably held by the lower case 1001, and rotation of the tray 1004 opens/closes the opening formed in the front surface of the lower case 1001. In executing print operation, the exhaust tray 1004 is rotated toward the front surface side to open the opening. Print sheets can be exhausted from the opening, and sequentially stacked on the exhaust tray 1004. The exhaust tray 1004 stores two auxiliary trays 1004a and 1004b. If necessary, the auxiliary trays can be pulled out to enlarge/reduce the loading area of print sheets in three steps.

One end of the access cover 1003 is rotatably held by the upper case 1002 so as to be able to open/close the opening formed in the upper surface. By opening the access cover 1003, a printhead cartridge (not shown), ink tank (not shown), or the like stored in the main body can be exchanged. Although not shown, when the access cover 1003 is opened/closed, a projection formed on the rear surface of the cover 1003 rotates a cover open/close lever. The open/close state of the access cover 1003 can be detected by detecting the rotation position of the lever by a microswitch or the like.

A power key 1005 is arranged on the upper surface of the upper case 1002. A control panel 1010 which comprises a liquid crystal display unit 1006, various key switches, and the like is provided on the right side of the upper case 1002.

The structure of the control panel 1010 will be described in detail later with reference to FIG. 2. Reference numeral 1007 denotes an automatic feeder which automatically feeds a print sheet into the apparatus main body. Reference numeral 1008 denotes a paper gap select lever which is used to adjust the gap between the printhead and a print sheet. Reference numeral 1009 denotes a card slot which receives an adapter capable of receiving a memory card. Image data stored in the memory card can be directly read and printed via this adapter. Examples of the memory card (PC) are a compact flash™ memory card, smart media card, and memory stick. Reference numeral 1011 denotes a viewer (liquid crystal display unit) which is detachable from the main body of the PD printer 1000, and is used to display an image for one frame, index image, or the like when the user wants to search images stored in the PC card for an image to be printed. Reference numeral 1012 denotes a USB terminal which is used to connect a digital camera (to be described later). Also, another USB connector for connecting a personal computer (PC) is provided on the rear surface of the PD printer 1000.

Figure 2:
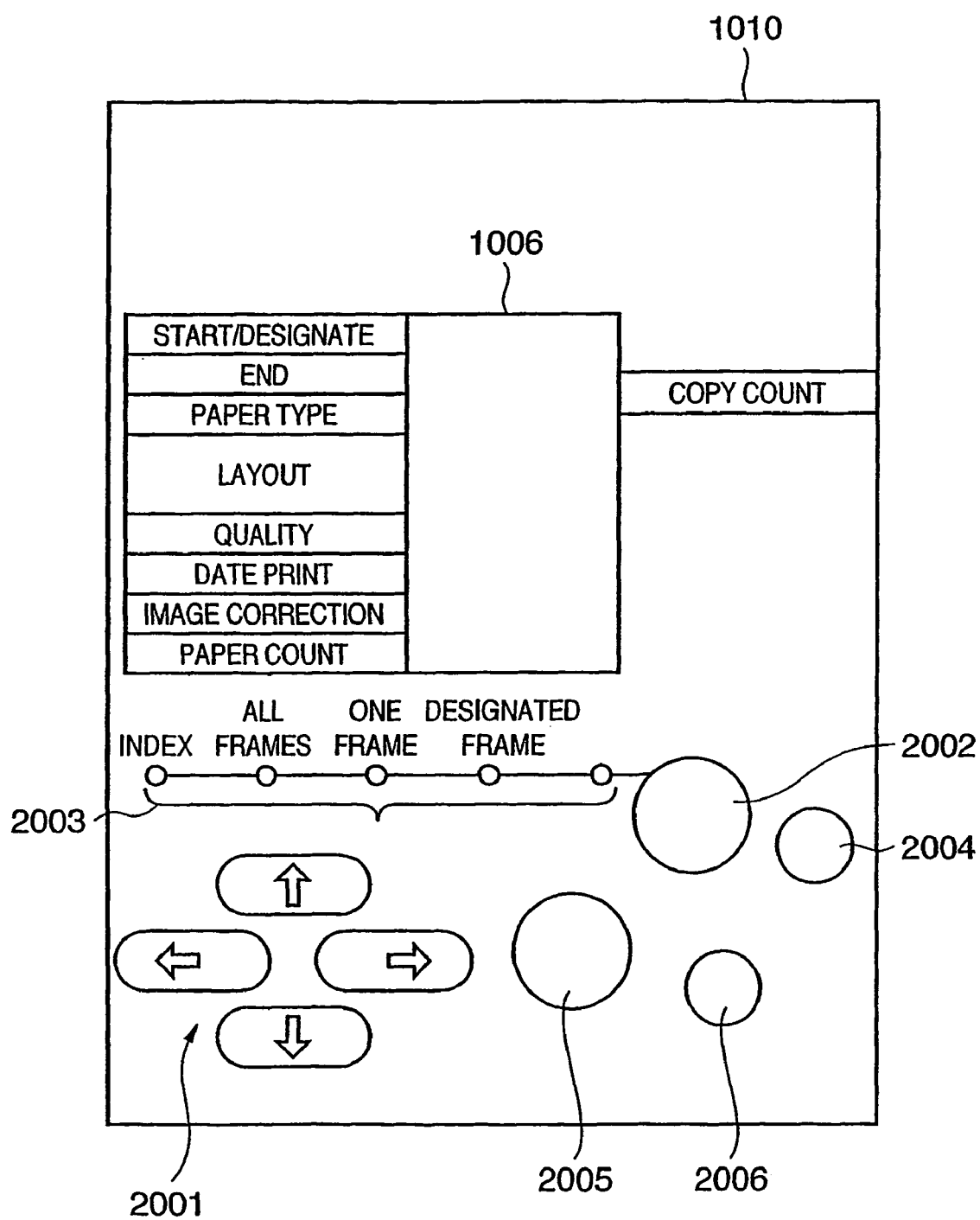
FIG. 2 depicts a schematic view of the control panel of the PD printer according to the embodiment.

FIG. 2 depicts a schematic view of the control panel 1010 of the PD printer 1000 according to the embodiment.

Referring to FIG. 2, the liquid crystal display unit 1006 displays menu items for various setups of data associated with items printed on the right and left sides of the unit 1006. The items displayed in the liquid crystal display unit 1006 include, e.g., the first number or designated frame number of a photo to be printed (start/designate), the final photo number subjected to printing end operation (end), the number of copies to be printed (copy count), the type of paper sheet (print sheet) used for printing (paper type), the setup of the number of photos to be printed on one paper sheet (layout), designation of print quality (quality), designation as to whether or not to print a photographing date (date print), designation as to whether or not to print a photo after correction (image correction), display of the number of paper sheets required for printing (paper count), and the like. These items are selected or designated using cursor keys 2001 by a user. Reference numeral 2002 denotes a mode key. Every time the mode key 2002 is pressed, the type of print (index print, all-frame print, one-frame print, and the like) can be switched, and a corresponding one of LEDs 2003 is turned on in accordance with the selected type of print. Reference numeral 2004 denotes a maintenance key which is used to perform maintenance of the printer such as cleaning of the printhead. Reference numeral 2005 denotes a print start key which is pressed when the start of print is designated or when the maintenance setup is settled. Reference numeral 2006 denotes a print cancel key which is pressed when printing or maintenance is canceled.

Figure 3:
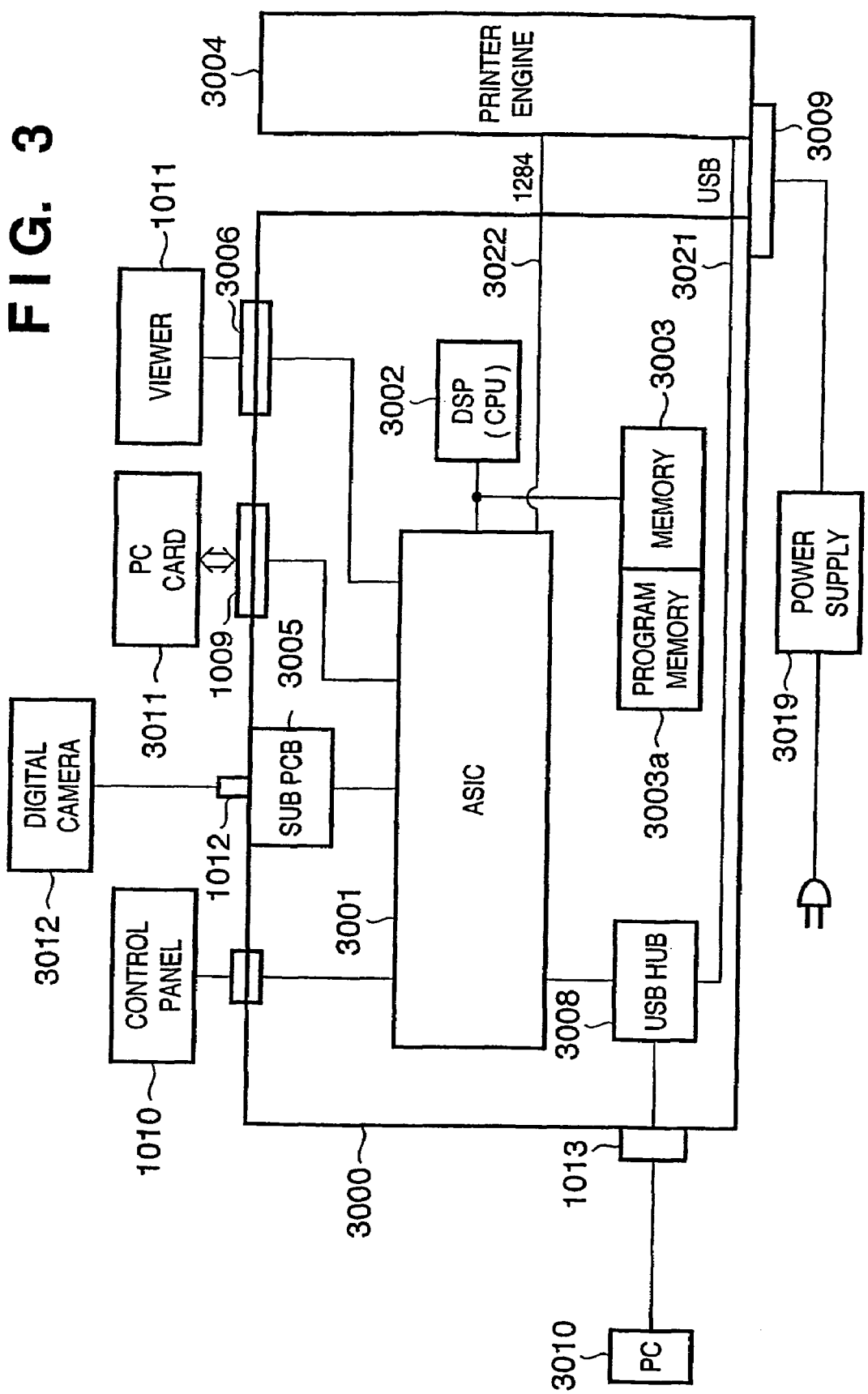
FIG. 3 is a block diagram showing the arrangement of principal part associated with control of the PD printer according to the embodiment.

The arrangement of principal part associated with control of the PD printer 1000 according to the embodiment will be described below with reference to FIG. 3. In FIG. 3, the same reference numerals denote parts common to those in the above drawings, and a description thereof will be omitted.

Referring to FIG. 3, reference numeral 3000 denotes a controller (control board). Reference numeral 3001 denotes an ASIC (dedicated custom LSI). Reference numeral 3002 denotes a DSP (Digital Signal Processor) which incorporates a CPU and executes various control processes (to be described later), and image processes such as conversion from a luminance signal (RGB) into a density signal (CMYK), scaling, gamma conversion, and error diffusion. Reference numeral 3003 denotes a memory having a program memory 3003a which stores a control program for the CPU of the DSP 3002, a RAM area has a memory area functioning as a work area which stores image data and the like. Reference numeral 3004 denotes a printer engine. In the embodiment, the printer is equipped with a printer engine for an ink-jet printer which prints a color image by using a plurality of color inks. Reference numeral 3005 denotes a USB connector serving as a port for connecting a digital camera (DSC) 3012. Reference numeral 3006 denotes a connector for connecting the viewer 1011. Reference numeral 3008 denotes a USB hub (USB HUB). When the PD printer 1000 executes printing on the basis of image data from a PC 3010, the USB hub 3008 allows data from the PC 3010 to pass through it, and outputs the data to the printer engine 3004 via a USB 3021. The connected PC 3010 can directly exchange data and signals with the printer engine 3004 and execute printing (functions as a general PC printer). Reference numeral 3009 denotes a power supply connector which inputs a DC voltage converted from commercial AC power from a power supply 3019. The PC 3010 is a general personal computer. Reference numeral 3011 denotes a memory card (PC card) mentioned above; and numeral 3012 denotes the digital camera (to be also referred to as a DSC: Digital Still Camera).

Note that signals are exchanged between the controller 3000 and the printer engine 3004 via the USB 3021 or an IEEE1284 bus 3022.

Figure 4:
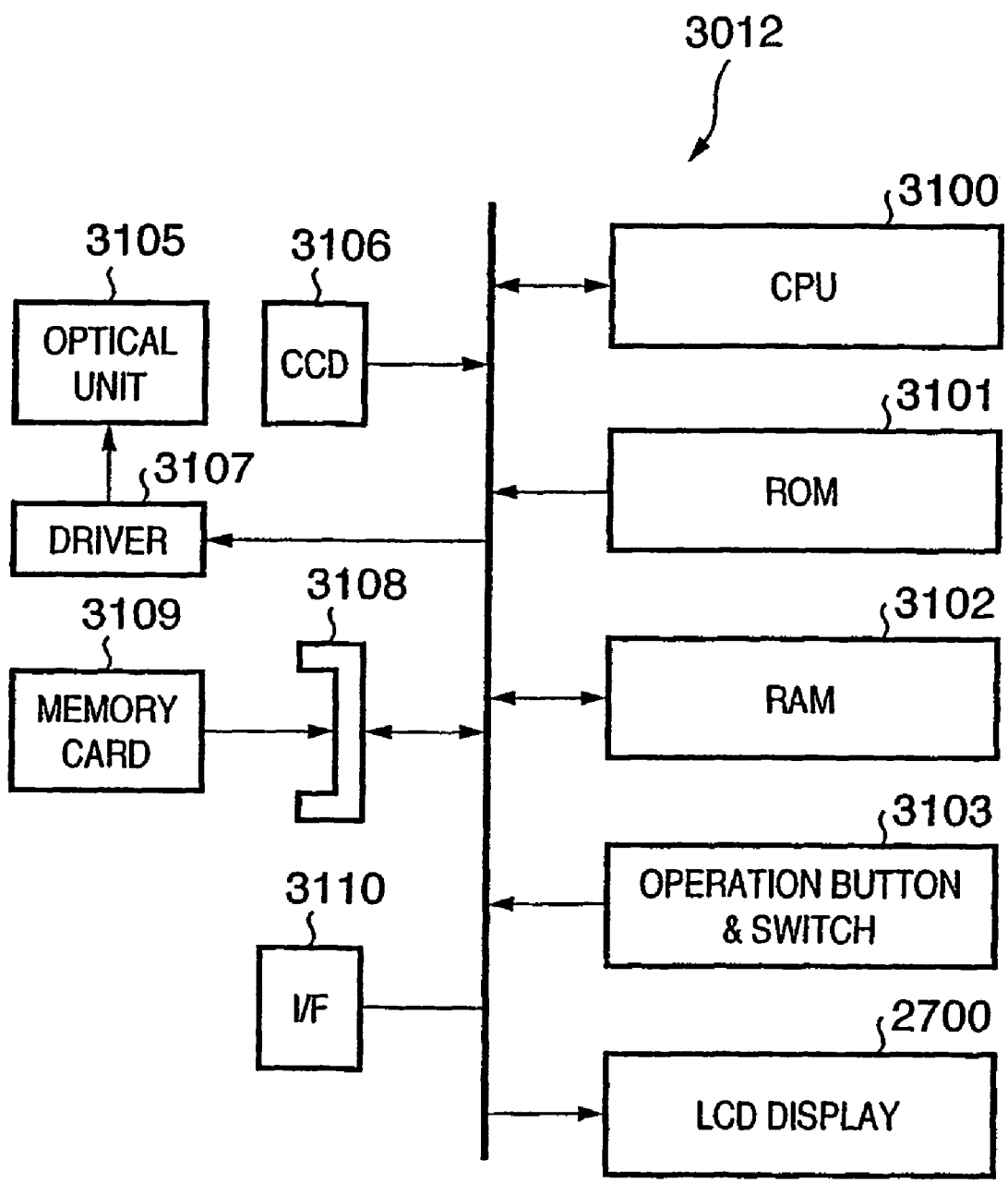
FIG. 4 is a block diagram showing the arrangement of a DSC according to the embodiment.

FIG. 4 is a block diagram showing the arrangement of the DSC (Digital Still Camera) 3012.

Referring to FIG. 4, reference numeral 3100 denotes a CPU which controls the overall DSC 3012; and numeral 3101 denotes a ROM which stores the process sequence (control program) of the CPU 3100. Reference numeral 3102 denotes a RAM which is used as a work area for the CPU 3100; and numeral 3103 denotes a switch group which is used to perform various operations. The switch group 3103 includes various switches, cursor keys, and the like. Reference numeral 2700 denotes a liquid crystal display unit which is used to display an image photographed at present or a sensed/stored image and display a menu for performing various setups to the DSC 3012. Reference numeral 3105 denotes an optical unit which mainly comprises a lens and its drive system. Reference numeral 3106 denotes a CCD element; and numeral 3107 denotes a driver which drives and controls the optical unit 3105 under the control of the CPU 3100. Reference numeral 3108 denotes a connector for connecting a storage medium 3109 (compact flash™ memory card, smart media card, or the like); and numeral 3110 denotes a USB interface (USB slave side) for connecting a PC or the PD printer 1000 of the embodiment.

Figure 5:
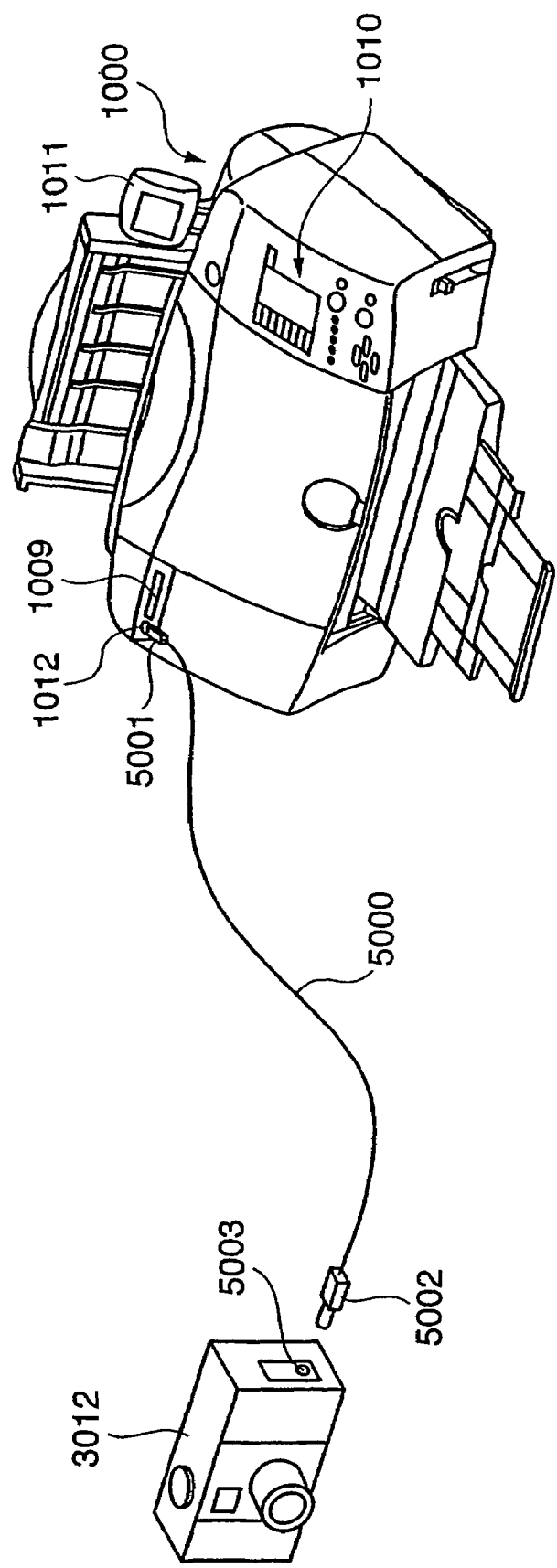
FIG. 5 depicts a view for explaining connection between the PD printer and a digital camera according to the embodiment.

FIG. 5 depicts a view for explaining connection between the PD printer 1000 and the DSC 3012 according to the embodiment. The same reference numerals denote parts common to those in the above drawings, and a description thereof will be omitted.

Referring to FIG. 5, a cable 5000 comprises a connector 5001 which is connected to the connector 1012 of the PD printer 1000, and a connector 5002 for connecting a connector 5003 of the digital camera 3012. The digital camera 3012 can output image data saved in an internal memory (memory card) via the connector 5003. The digital camera 3012 can take various arrangements such as an arrangement which incorporates a memory as a storage means and an arrangement having a slot for inserting a removal memory. The PD printer 1000 and digital camera 3012 are connected via the cable 5000 shown in FIG. 5, and image data from the digital camera 3012 can be directly sent to the PD printer 100 and printed by the PD printer 1000.

Operation examples of the print system according to the embodiment on the basis of the above arrangement will be explained as embodiments.

First Embodiment

The outline of the operation of a print system including a DSC 3012 and PD printer 1000 based on the above arrangement will be described. In the print system according to the first embodiment, the DSC 3012 and PD printer 1000 can operate in accordance with DPS (Direct Print System) specifications.

Figure 6:
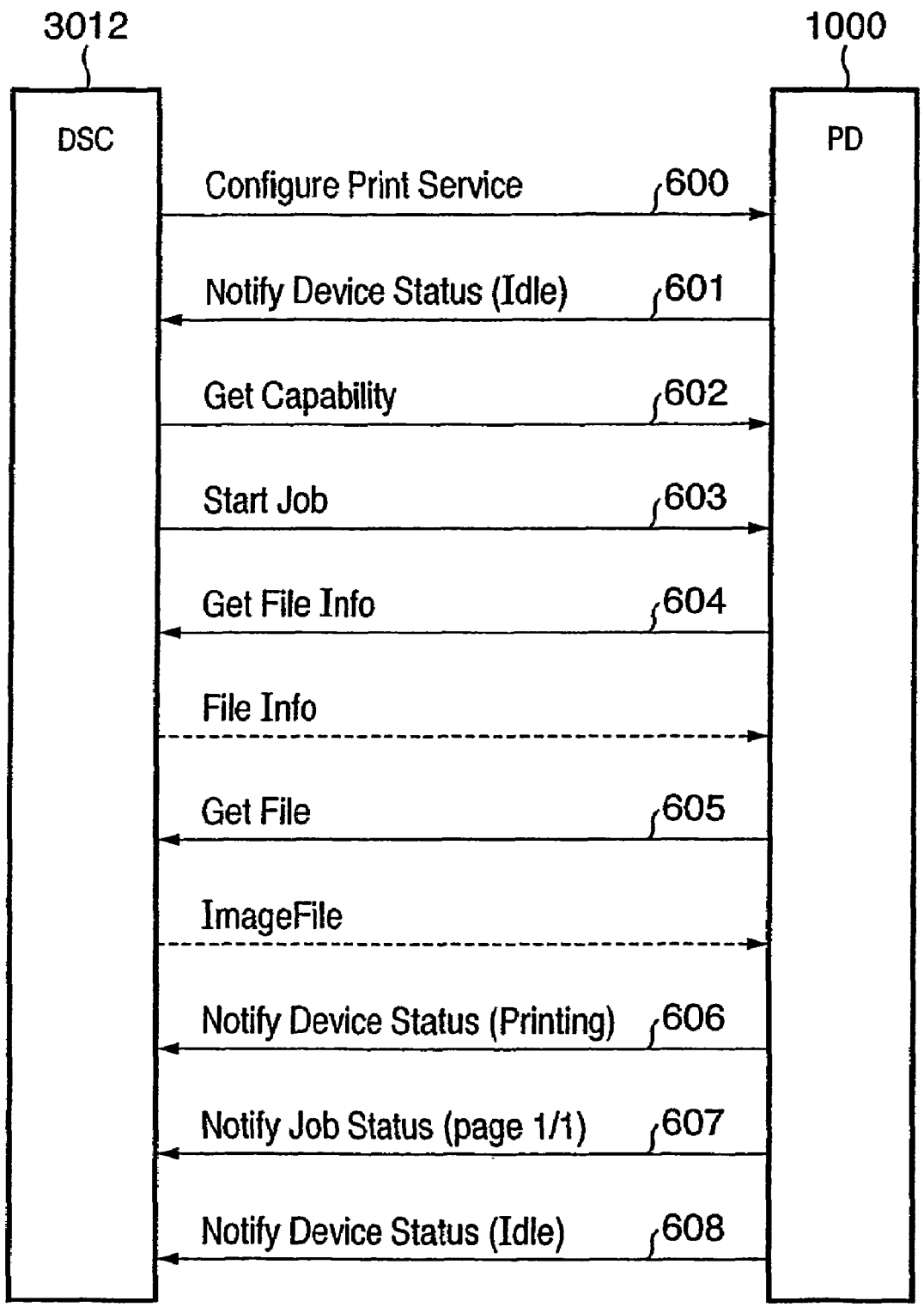
FIG. 6 depicts a chart for explaining command exchange between the PD printer and the DSC in a print system according to the embodiment.

FIG. 6 depicts a chart for explaining a sequence when the DSC 3012 issues a print request to the PD printer 1000 to print in the print system according to the first embodiment.

This process sequence is executed when the PD printer 1000 and DSC 3012 are connected via a cable 5000 and have confirmed that they comply with the DPS specifications. The DSC 3012 transmits "ConfigurePrintService" to the PD printer 1000 to acquire the state of the PD printer 1000 (600). In response to this, the PD printer 1000 notifies the DSC 3012 of the current state (in this case, "idle" state) of the PD printer 1000 (601). The DSC 3012 inquires the capability of the PD printer 1000 (602), and issues a print start request (StartJob) corresponding to the capability (603). The print start request is issued on condition that "newJobOK" (FIG. 8B) in status information (to be described later) from the PD printer 1000 is "True" in 601.

In response to the print start request, the PD printer 1000 requests file information of the DSC 3012 on the basis of the file ID of image data to be printed (604). In response to this, the DSC 3012 transmits file information. The file information contains items of information such as the file capacity (file size), presence/absence of a thumbnail image, and file attributes. When the PD printer 1000 receives the file information and determines that the file can be processed, the PD printer 1000 requests the file of the DSC 3012 (605). The DSC 3012 sends image data of the requested file to the DSC 3012. After then, when the PD printer 1000 starts a print process, the PD printer 1000 sends status information representing "Printing" to the DSC 3012 by "NotifyDeviceStatus" in 606. After a print process of one page ends, the PD printer 1000 notifies the DSC 3012 of the end of the print process by "NotifyJobStatus" 607 at the start of processing the next page. For print of only one page, the PD printer 1000 notifies the DSC 3012 of the "idle" state by "NotifyDviceStatus" 608 at the end of printing one requested page. For N-up print of laying out a plurality of (N) images on one page and printing them, the PD printer 1000 sends "NotifyJobStatus" 607 to the DSC 3012 every time N images are printed. The issuing timings of "NotifyJobStatus" and "NotifyDeviceStatus" and the image data acquisition order in the first embodiment are merely examples, and various cases are conceivable depending on the product specification.

The print process includes a case in which the file IDs of image data to be printed are contained and transmitted at once in a print start request (StartJob) from the DSC 3012 to perform print, and a case in which only the file ID of a DPOF file used in general photo development is contained in a print start request (StartJob) from the DSC 3012 and transmitted to the PD printer 1000, and the PD printer 1000 interprets the DPOF file, acquires the file ID of necessary image data, and prints.

FIG. 7 depicts a view for explaining an example of a print start request issued by the DSC 3012 to the PD printer 1000.

In FIG. 7, numeral 720 denotes the configuration (job-Config) of the print job, and numeral 721 denotes print information (printInfo).

The configuration 720 will be explained. Numeral 700 (quality) designates the print quality such as "normal" or "high quality". Numeral 701 (paperSize) designates the paper size, and numeral 702 (paperType) designates the paper type such as "plain paper", "photo paper", or "ink-jet paper". Numeral 703 (fileType) designates the type of an image file to be printed, and when, for example, DPOF is used, the type representing DPOF is designated by the file type 703. Numeral 704 (datePrint) designates whether or not to print a date, numeral 705 (fileNamePrint) designates whether or not to print a file name, numeral 706 (imageOptimize) designates whether or not to optimize an image, numeral 707 (fixedSize) designates whether or not to perform fixed-size print, and numeral 708 (cropping) designates whether or not to print a designated range of an image.

The print information 721 contains a file ID 709 (fileId) and date information 710 (date).

FIGS. 8A and 8B depict views for explaining items of information contained in JobStatus and DeviceStatus described above. JobStatus (FIG. 8A) and DeviceStatus (FIG. 8B) are transmitted from the PD printer 1000 to the DSC 3012. The DSC 3012 can request the PD printer 1000 to transmit these items of information at an arbitrary timing.

In FIG. 8A, "prtPID", "ImagePath", and "copyID" become effective when print of a DPOF file is designated. A "prtPID" is identification information (ID) of a print section designated by a DPOF file. An "ImagePath" is information of a path for specifying an image file designated by the DPOF file. A "copyID" designates the number of a copy during print upon designating print of a plurality of copies. In print based on a DPOF file, the DSC 3012 describes "fileID" of the DPOF file in a print start request (StartJob), and transmits the print start request to the PD printer 1000. In response to this, the PD printer 1000 can start printing the DPOF file. The PD printer 1000 acquires the DPOF file on the basis of "fileID" of the DPOF file, executes "GetFileID", and specifies "fileID" of an image file designated in the DPOF file. The PD printer 1000 requests the image file of the DSC 3012, and acquires the image data. As a result, an image designated in the DPOF file can be printed. During execution of print based on the DPOF file, the PD printer 1000 notifies the DSC 3012 by "NotifyJobStatus" of "prtPID", "ImagePath", and "copyID" representing the progress of printing.

When the print process restarts after interruption due to any reason during print of the DPOF file, the print process restarts from a top of the page at which the print process was aborted.

A "progress" represents the current page (N/T) during print out of a prospective number of pages. N represents the current print page, and T represents the total number of print pages to be printed. An "imagePrinted" represents the number of printed images.

A DeviceStatus (FIG. 8B) will be explained.

A "dpsPrintServiceStatus" designates the state of the PD printer 1000, and is transmitted to the DSC 3012 from the PD printer 1000. A "dpsPrintServiceStatus" includes idle, print, and pause states. A "jobEndReason" designates the end state of a print process, and is transmitted to the DSC 3012 upon the completion of printing the final page. An "errorStatus" represents an error state, and is transmitted upon generation of an error. An "errorReason" means a cause of generation the error, and is transmitted together with "errorStatus".

A "disconnectEnable" means that print is possible even if the USB cable 5000 is disconnected from the PD printer 1000. The PD printer 1000 notifies the DSC 3012 of "disconnectEnable". A "capabilityChanged" means that the capability in the PD printer 1000 has been changed, and is transmitted to the DSC 3012. A "newJobOK" means that the PD printer 1000 can accept a print request, and is transmitted to the DSC 3012.

FIG. 9 is a flow chart showing a print restart process in the DSC 3012 according to the first embodiment. A program which executes this process is stored in a ROM 3101, and a CPU 3100 executes a control process in accordance with the program to realize the process.

In this process, print operation is aborted when, e.g., the cable 5000 is disconnected during execution of a print job. After that, DPS reconnection is established, the print button of the DSC 3012 is designated, and the PD printer 1000 is instructed to restart print operation. The PD printer 1000 then restarts print.

This process assumes that interruption of a print process in the PD printer 1000 and interruption of a print process in the DSC 3012 are recognized by the PD printer 1000 and the DSC 3012.

In step S1, it is determined whether the DSC 3012 and PD printer 1000 have physically been connected by connecting the cable 5000 or the like and DPS reconnection has been established. If the connection is established, the process advances to step S2. If the DSC 3012 designates the restart of print, it is determined whether print process has been interrupted. If the print process has not interrupted, the process advances to step S3 to perform a normal print process such as a process of newly starting print process in accordance with a print instruction.

If the print process has been interrupted, the process advances to step S4. It is determined whether the PD printer 1000 which has newly established connection is of the same model (same <dpsVersion> and <productName>), the model of the same manufacturer (<productName>), or the model of the same vendor (<vendorName>) as that of the PD printer 1000 which has interrupted the previous print process. In this procedure, the model of the PD printer 1000 is determined on the basis of contents sent as a response from the PD printer 1000 for "ConfigurePrintService" issued by the DSC 3012. When the same PD printer is reconnected, no problem occurs. Even for a printer of another model, if the manufacturer or vendor of the printer is the same and a re-print process according to the first embodiment is possible on the basis of the design of the manufacturer or vendor, restart of printing can be determined to be possible, and the process advances to a subsequent process S6. If NO in step S4, the process advances to step S5 to determine that continuation of print process is impossible, and display a message on the display unit 2700 of the DSC 3012. If necessary, the UI (user menu window) displayed on the display unit 2700 may be changed.

If the reconnected apparatus is determined in step S4 to be of a compatible model, the process advances to step S6 to determine whether print process is performed using a DPOF file. If YES in step S6, the process advances to step S7 to transmit the file ID of the DPOF file to the PD printer 1000. In this case, "prtPID", "ImagePath", and "copyID" described above are transmitted together with the file ID of the DPOF file, thereby designating a file subjected to the restart of print process using the DPOF file.

If the print process is not performed using DPOF file in step S6, i.e., each image file is to be designated and printed, the file IDs of image files except printed image files among the file IDs of image files to be printed are transmitted at once to the PD printer 1000 to execute print. Note, as a print restart instruction, a print button is designated among the operation buttons of the DSC 3012 to send "StartJob" from the DSC 3012 to the PD printer 1000 and print process is restarted.

The PD printer 1000 notifies the DSC 3012 of the end of printing each page by "jobStatus" (meaning the start of printing the next page) sent from the PD printer 1000 at the start of the next page, or "jobEndReason" contained in "deviceStatus" for the final page. The DSC 3012 can, therefore, confirm the number of printed images. Whether print process has been interrupted can be determined based on whether the number of images designated by a print instruction have been printed when images are printed one by one, or from the progress ("prtPID", "ImagePath", and "copyID") in a DPOF file or whether print process has been completed when the print process is based on the DPOF file.

When one image is printed on one page, the number of print paper sheets coincides with the number of images. When, however, a plurality of (N) images are laid out and printed on one paper sheet, the number of images to be printed does not coincide with the number of print paper sheets. The DSC 3012 must make the number of print paper sheets and the number of image data match with each other in accordance with the print mode.

Second Embodiment

When date print <datePrint> 704 in <jobConfig> 720 in FIG. 7 is designated, <date> 710 contained in <printInfo> 721 is printed. When date print <datePrint> 704 in <jobConfig> 720 is not designated, date data is ignored and is not printed even if <date> 710 is contained in <printInfo> 721.

This can increase the degree of freedom of data contained in <printInfo> 721. A startJob command can be created by, e.g., directly pasting, to <printInfo> 721, image data and a date list which are used by another job.

Third Embodiment

Figure 10:
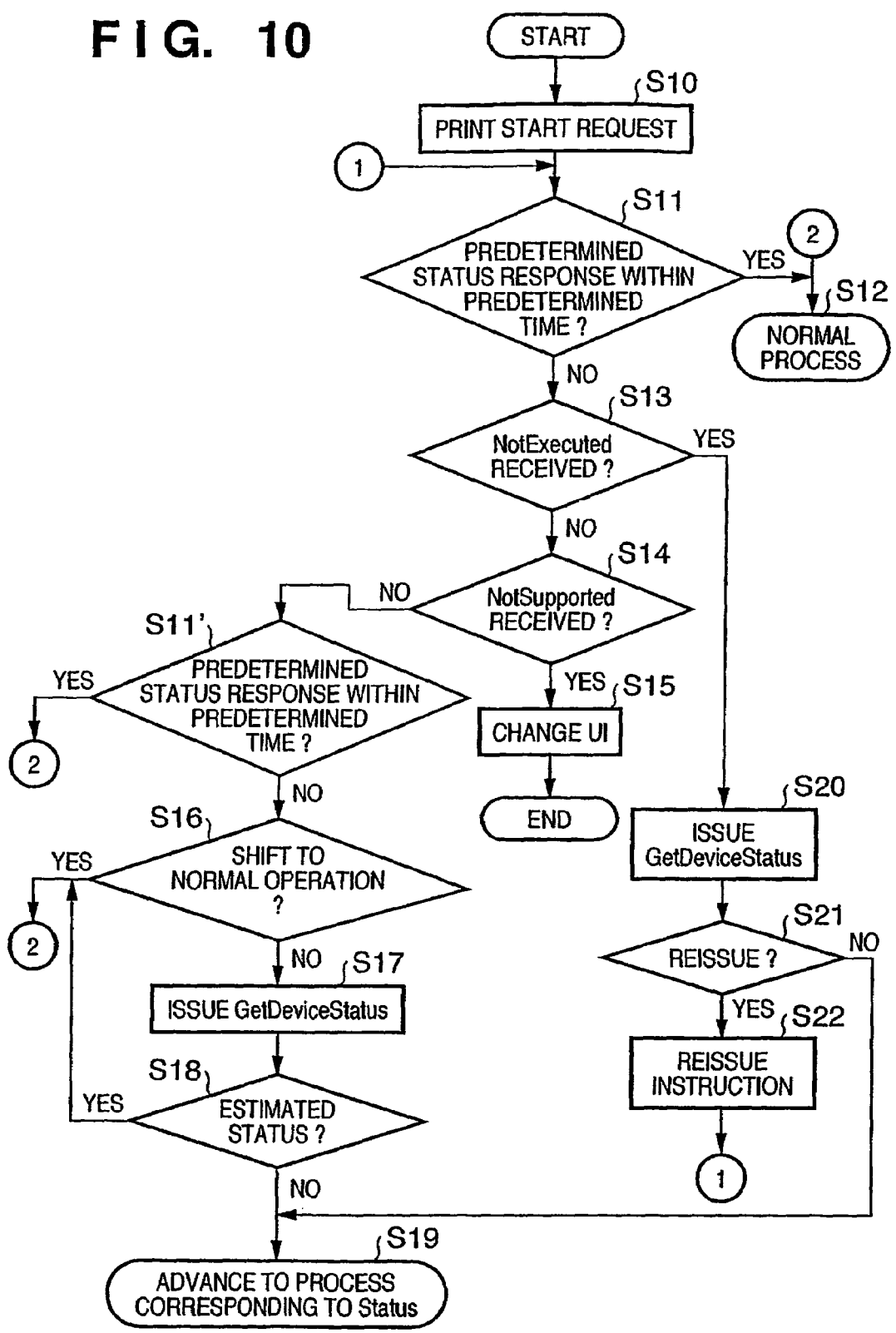
FIG. 10 is a flow chart for explaining a process by a DSC according to the third embodiment.

FIG. 10 is a flow chart for explaining a process in a print system according to the third embodiment of the present invention.

In the third embodiment, when the DSC 3012 issues any command to the PD printer 1000 and the status of the PD printer 1000 changes, the PD printer 1000 notifies the DSC 3012 of the status by "NotifyDeviceStatus" described above. However, when the state of the PD printer 1000 does not change or a response delays, the DSC 3012 determines (estimates) that a prospective status change has occurred in the PD printer 1000 by a previously issued command, and executes a corresponding process. To confirm the state of the PD printer 1000, the DSC 3012 issues "GetDeviceStatus" to the PD printer 1000, acquires the state of the PD printer 1000, and executes a process corresponding to the acquired status of the printer.

An example of this process will be explained with reference to the flow chart of FIG. 10.

In step S10, a print start request "StartJob" is issued to the PD printer 1000. The process advances to step S11 to determine whether a predetermined status response "NotifyDeviceStatus" is received from the PD printer 1000. If the PD printer 1000 is a product-type capable of accepting only one print job, newJobOK of NotifyDeviceStatus indicating that the PD printer 1000 can accept the next print job should represent "False" after issuing the print start request "start-Job" to the PD printer 1000. If a normal response (newJobOK is "False") is received in step S11, the process advances to step S12 to wait until "newJobOK" changes to "True". Thereafter, a normal print process of issuing the next command or outputting image data or the like in accordance with a request from the PD printer 1000 is executed.

In step S13, it is determined whether "NotExecuted" representing that "StartJob" could not be executed has been received. If "NotExecuted" has been received, the process advances to step S20 to issue "GetDeviceStatus" to the PD printer 1000 and acquire the current status of the PD printer 1000. If this status reveals the reason why the instruction could not be executed, and "StartJob" can be reissued, a message to this effect is displayed on the UI of the display unit 2700 of the DSC 3012. After then, if the user designates reissuing of an instruction by using the button 3103, the process advances from step S21 to S22 to reissue to the PD printer 1000 the "StartJob" instruction which has not been executed. If no reissuing designation is input in step S21, the process advances from step S21 to step S19.

If no "NotExecuted" has been received in step S13, the process advances to step S14 to determine whether "NotSupported" has been received. If "NotSupported" has been received, the process advances to step S15. In this case, the previously issued "StartJob" is not supported by the PD printer 1000, and, for example, non-supported items (impossible designation) are displayed on the UI of the display unit 2700 so as to represent that the print instruction is not supported by the PD printer 1000.

The meaning of not supporting the "StartJob" instruction includes a case in which the PD printer 1000 does not support the "StartJob" instruction itself, and also a case in which the PD printer 1000 supports the "StartJob" instruction itself but does not support the currently issued "StartJob" instruction because an unsupported paper size or paper type is designated. In this case, the UI of the DSC 3012 is so reconstructed as to disable selection of an improper paper size or paper type (items to be set for print operation), similar to the above-described example. This can decrease the possibility of receiving "NotSupported" again when a "StartJob" instruction is executed again to the PD printer 1000. Note, upon receiving the "NotSupported", a process of, e.g., confirming a paper size or paper type supported by the PD printer 1000 may be performed.

If no "NotSupported" has been received in step S14, the process advances to step S11'. This step assumes that the response content is substantially "OK". If a predetermined status response is received in step S11', the process advances to step S12 to continue a normal operation. If no predetermined status information is received in step S11', the process advances to step S16 to determine whether to continue the operation as normal operation. This may be displayed using the above-mentioned UI to allow the user to select the normal operation. If the process shifts to the normal operation, the process advances to step S12. If the user does not input any instruction and the process does not shift to the normal operation, the process advances to step S17 to request the status of the PD printer 1000 by using "GetDeviceStatus". The process advances to step S18, and the status of the PD printer 1000 is acquired and if the status is an ordinary one, this status is determined to be a normally estimated one, and the process advances to step S12. If another status is acquired, the process advances to step S19 to execute a process corresponding to the acquired status.

The reason why unestimated "NotExecuted" has been sent back as a response in step S13 is that, for example, a PC 3010 is connected to the PD printer 1000, a print instruction from the PC 3010 is received by the PD printer 1000 at almost the same time as a print start request from the DSC 3012 and a print process of print data from the PC 3010 is commenced. That is, since the DSC 3012 recognizes "newJobOK"="True" in advance on the basis of NotifyDeviceStatus issued by the PD printer 1000, the DSC 3012 issues a "StartJob" command. However, immediately when the "StartJob" command is issued, "newJobOK"="False" is set, and the PD printer 1000 sends back "NotExecuted" as a response. The DSC 3012 which has recognized "newJobOK"="True" receives the unestimated response "NotExecuted" from the PD printer 1000. The reason why no predetermined status information has been received in step S11 is that, for example, the PD printer 1000 is a product capable of accepting a plurality of print jobs and even after a print request "StartJob" is accepted, "newJobOK" of "DeviceStatus" is kept unchanged as "True", and thus the PD printer 1000 does not issue "NotifyDeviceStatus" to the DSC 3012. Also in this case, the DSC 3012 securely operates on the assumption that "newJobOK" is "False" until the state of the PD printer 1000 has been confirmed by "GetDeviceStatus" (because of the possibility of delaying issuing of "NotifyDeviceStatus" representing "newJobOK"="False" due to any cause).

The above description assumes that, even when a command from the DSC 3012 and a command from the PD printer 1000 are almost simultaneously issued, both the commands become effective. However, there may be also a direct print specification: "of almost simultaneously issued commands, a command from the DSC 3012 is preferentially processed, and issuing of a command from the PD printer 1000 is ignored and discarded". In this case, the check content in step S11 is "whether a command issued from the PD printer 1000 has been received?". If YES in step S11, the process advances to step S13 via a step (not shown) of ignoring a command from the PD printer 1000; if no command is received from the printer 1000, the process directly advances to step S13.

In the above direct print specification, the discarded command of the PD printer 1000 may be reissued by the PD printer 1000. A case in which a print instruction from the PC 3010 is received at almost the same time as "StartJob" from the DSC 3012 and a print process for print data from the PC 3010 is commenced will be exemplified. The DSC 3012 which has recognized in advance "newJobOK"="True" by NotifyDeviceStatus issued by the PD printer 1000 in advance issues a "StartJob" instruction. At almost the same time, the PD printer 1000 which starts a print process for print data from the PC 3010 changes to "newJobOK"="False". In order to notify the DSC 3012 of this, the PD printer 1000 issues a "NotifyDeviceStatus" instruction to the DSC 3012. However, the "NotifyDeviceStatus" instruction issued by the PD printer 1000 is discarded, and the "StartJob" instruction issued by the DSC 3012 is preferentially processed. Since the PD printer 1000 has already changed "newJobOK" to "False", it sends back "NotExecuted" in response to the "StartJob" instruction. At this time, the PD printer 1000 must reissue the "NotifyDeviceStatus" instruction in order to notify the DSC 3012 of "newJobOK"="False". At this time, if the DSC 3012 issues the next command, instructions (commands) are almost simultaneously issued from the two devices again.

Basically, the situation in which the two devices almost simultaneously issue commands and one of them is discarded may occur when criterion statuses used to issue commands from the two devices are different. In this case, the direct print process becomes very unstable and is in a dangerous state. Hence, the situation in which the two devices almost simultaneously issue commands is preferably avoided as much as possible. For this purpose, for example, when the DSC 3012 detects "issuing of a command from the PD printer 1000" in step S11, issuing of a "GetDeviceStatus" instruction may be inhibited in step S20 or S17 for a predetermined time period to wait for a command from the PD printer 1000.

Also in the PD printer 1000 as a partner of the direct print, inhibition of issuing a command from the PD printer 1000 for a predetermined time period and a wait for a command from the DSC 3012 may be set. If, however, these predetermined inhibition time periods are equal, commands will be almost simultaneously issued from the two devices after the elapse of the predetermined time period. Considering this possibility, the predetermined time period may not be fixed and may be changed dynamically discontinuously or irregularly. Alternatively, the inhibition time period used when "issuing of a command by the PD printer 1000 is not detected" in step S11 may be used until "issuing of a command by the PD printer 1000 is detected" in step S11, and updated when "issuing of a command by the PD printer 1000 is detected" in step S11. As a method of changing the timing of issuing command, the issuing timing may be advanced. To prevent the two devices from changing to the same timing, the timing may be changed by a predetermined rule. For example, the timing change method may be set depending on the USB host or slave. Alternatively, both the DSC 3012 and PD printer 1000 may comprise means for generating random timing signals, and command issuing timings may be determined in accordance with the timing signals, respectively. As described above, the PD printer 1000 may also be set to a state in which issuing of a command from the PD printer 1000 is inhibited for a predetermined time period, thereby decreasing the possibility of almost simultaneously issuing commands from the two devices. Various modifications described above can also be applied.

Fourth Embodiment

A process of continuing print from the DSC 3012 in the print system according to the fourth embodiment and a process of interrupting print process will be described. Also in this case, the arrangement of the print system and those of the DSC 3012 and a PD printer 1000 are the same as those described above, and a description thereof will be omitted.

Figure 11:
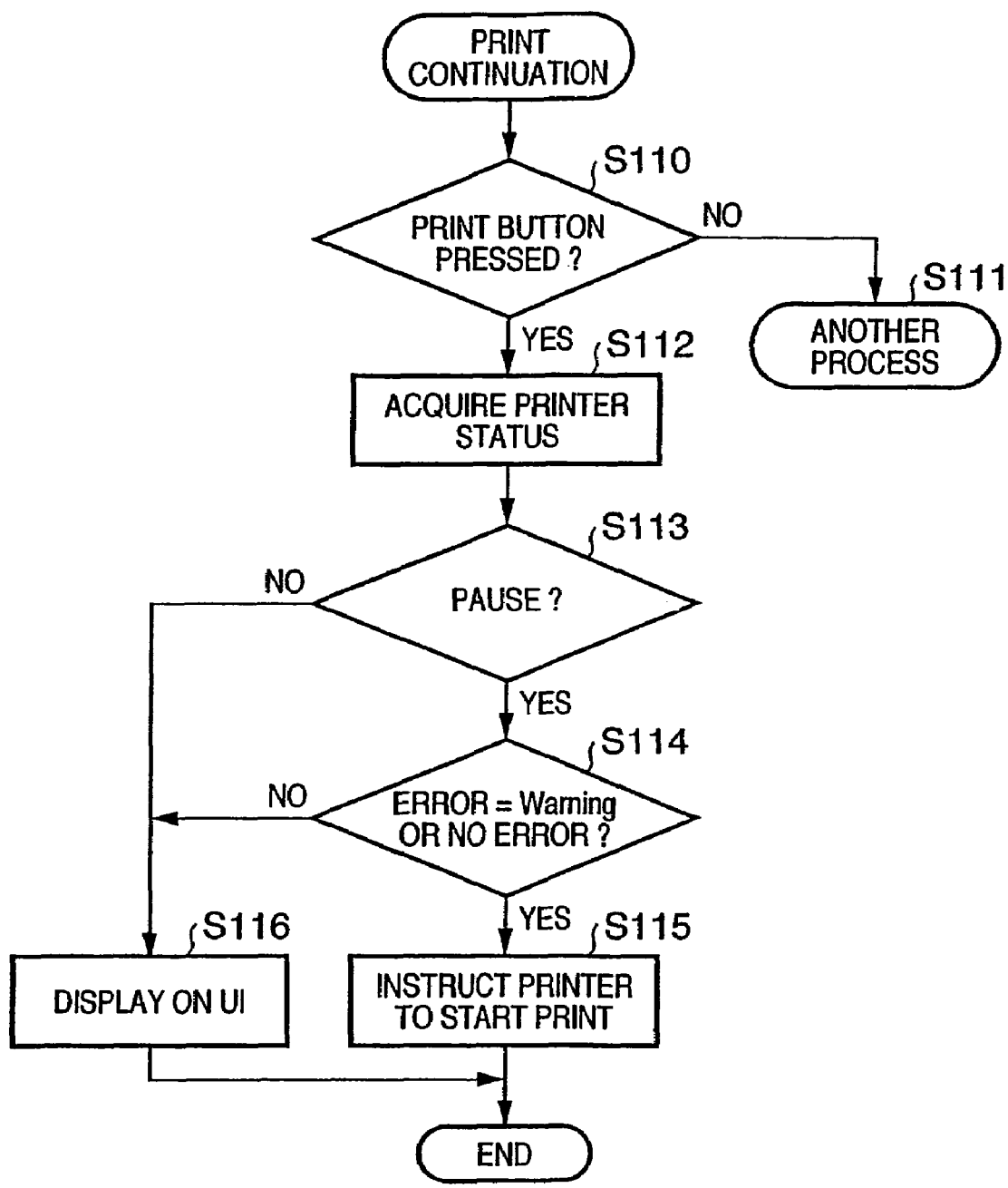
FIG. 11 is a flow chart for explaining a process accompanying button operation for continuing printing in a DSC according to the fourth embodiment.

FIG. 11 is a flow chart for explaining a print continuation process executed when a print process in the DSC 3012 according to the fourth embodiment is interrupted and then executed upon designating a print button which designates the print start.

In step S110, it is determined whether the print button among operation buttons 3103 of the DSC 3012 has been designated. If NO in step S110, the process advances to step S111 to execute another process such as a process corresponding to a designated button or a wait for an instruction with a button. If the print button has been designated, the process advances to step S112. A "GetDeviceStatus" is issued to the PD printer 1000 to request status information of the PD printer 1000 and acquire status information sent from the PD printer 1000 in response to the request. The process advances to step S113 to determine on the basis of the acquired status information whether the status of the PD printer 1000 is "pause". If YES in step S113, the process advances to step S114 to determine whether an error has occurred and "Warning" is set (e.g., a cable is disconnected), or no error has occurred. If YES in step S114, the restart of a print process is determined to be possible (because the status from the PD printer 1000 has been received). The process advances to step S115 to instruct the PD printer 1000 to restart the print process (transmit "ContinueJob").

If no pause state is set in step S113 or another error has occurred in step S114, the restart of print process is determined to be impossible, and a message to this effect is displayed on the UI of the display unit 2700. In this case, for example, a message is displayed on the display unit 2700 to notify the user that print process cannot restart, and/or selection of the print button is disabled. Wasteful press of the print button by the user can be avoided by acquiring the statue of the PD printer 1000 before press of the print button is determined in step S110, and notifying the user whether ON/OFF of the print button is effective.

Figure 12:
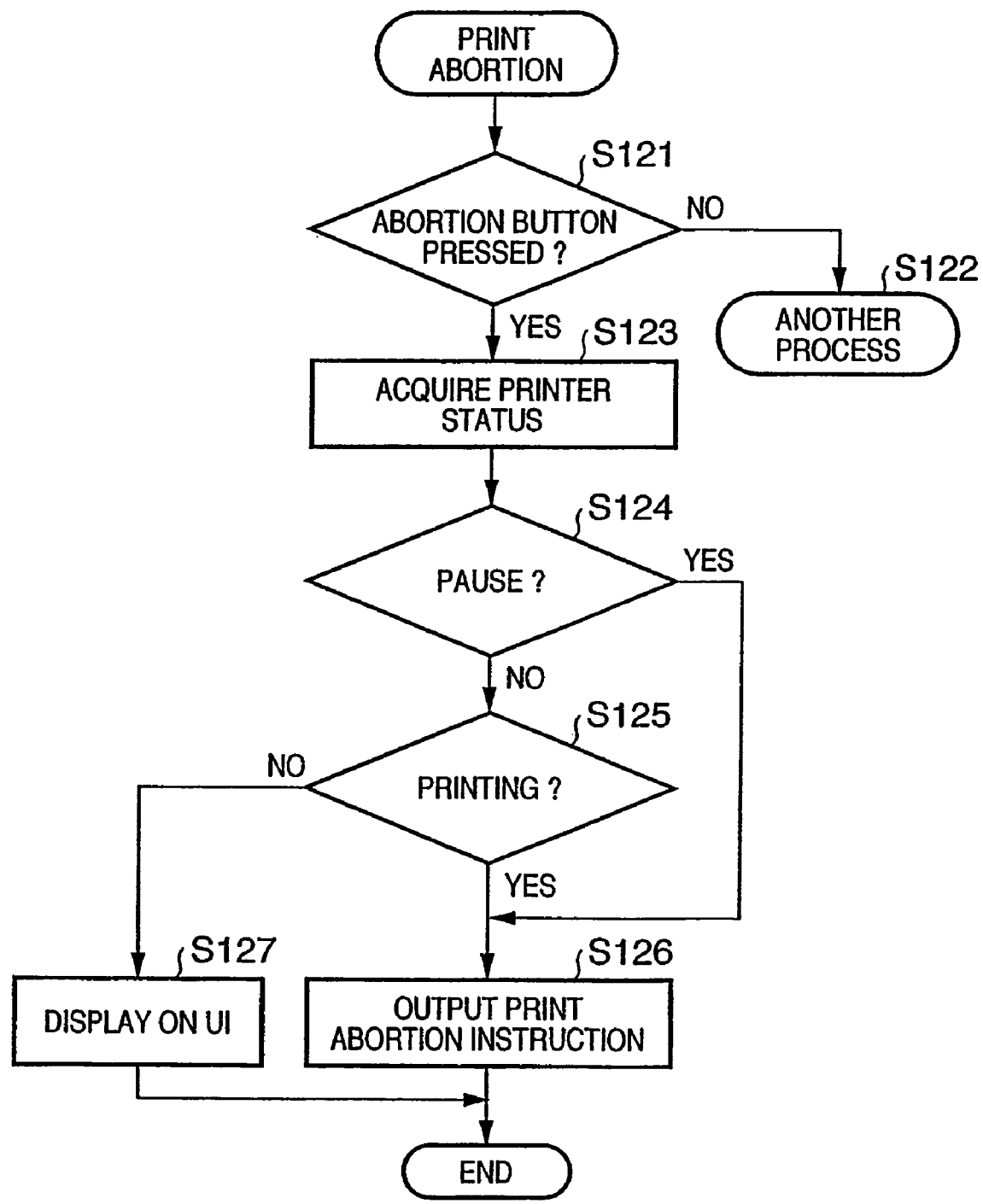
FIG. 12 is a flow chart for explaining a process accompanying button operation for aborting printing in the DSC according to the fourth embodiment.

FIG. 12 is a flow chart for explaining a print abortion process executed upon designating a print abortion button which designates abortion of a print process in the DSC 3012 according to the fourth embodiment.

In step S121, it is determined whether an abortion button among the operation buttons 3103 of the DSC 3012 has been designated. If NO in step S121, the process advances to step S122 to execute another process such as a process corresponding to a designated button or a wait for an instruction with a button. If the abortion button has been designated (pressed), the process advances to step S123. A "GetDeviceStatus" is issued to the PD printer 1000 to request current status information of the PD printer 1000 and acquire status information sent from the PD printer 1000 in response to the request. The process advances to step S124 to determine on the basis of the acquired status information whether the status of the PD printer 1000 is "pause". If YES in step S124, the process advances to step S126; if NO, to step S125 to determine whether print progresses. If YES in step S125, abortion of the print process is determined to be possible, and the process advances to step S126 to instruct the PD printer 1000 to abort the print process (transmit "AbortJob").

If NO in step S125, abortion of the print process is determined to be impossible, and a message to this effect is displayed on the UI of the display unit 2700. In this case, for example, a message is displayed on the display unit 2700 to notify the user that print cannot be aborted, and/or selection of the abortion button is disabled. Wasteful press of the abortion button by the user can be avoided by acquiring the statue of the PD printer 1000 before pressing of the abortion button is determined in step S121, and notifying the user whether press of the abortion button is effective.

Fifth Embodiment

Figure 13:
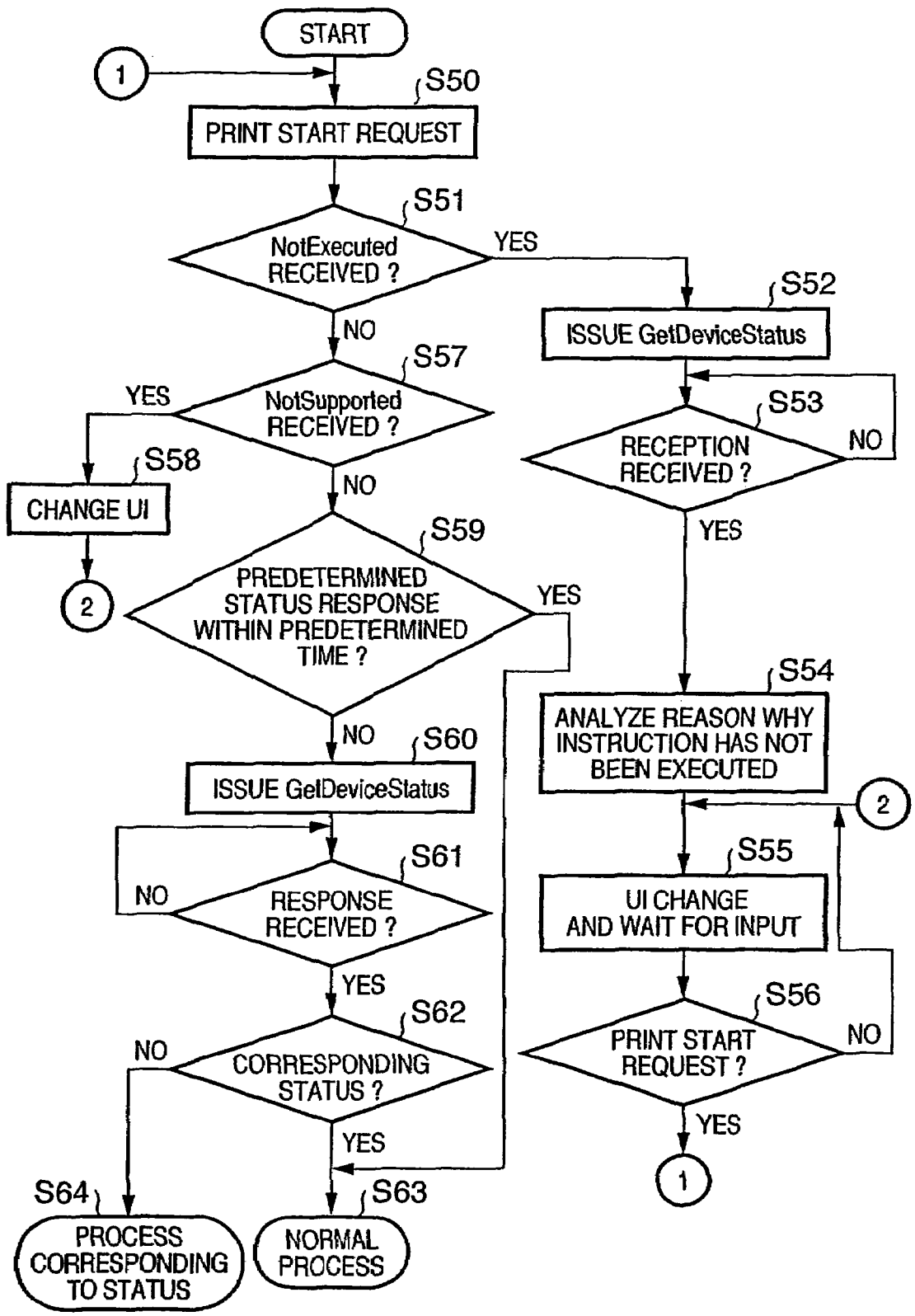
FIG. 13 is a flow chart for explaining a process by a DSC according to the fifth embodiment.

FIG. 13 is a flow chart for explaining a process in the print system according to the fifth embodiment of the present invention. A program which executes this process is stored in the ROM 3101. Also in the fifth embodiment, the arrangements of the DSC 3012 and PD printer 1000 are the same as those in the above embodiments, and a description thereof will be omitted.

In the fifth embodiment, when the DSC 3012 issues any command to the PD printer 1000, the DSC 3012 is notified of a response from the PD printer 1000 to the command. If the response includes an unestimated content, the DSC 3012 issues "GetDeviceStatus" to the PD printer 1000 to acquire the current state of the PD printer 1000. When the acquired status is one estimated from the command issued immediately before acquisition and the response content, a normal process is executed. On the other hand, the status is an unestimated one, a process corresponding to the status is executed.

In step S50, a "StartJob" instruction as a print start request is issued to the PD printer 1000. The process advances to step S51, and if a response to the print start request is received from the PD printer 1000, the content is determined. If the content includes "NotExecuted" representing that the "StartJob" instruction could not be executed, the process advances to step S52 to issue a "GetDeviceStatus" instruction to the PD printer 1000. In step S53, the DSC 3012 waits for a response to the instruction from the PD printer 1000, and acquires the current status of the PD printer 1000. In step S54, the reason why the print start instruction has not been executed is analyzed. If the reason is turned out, the process advances to step S55 to change the UI display and wait for an instruction input from the user who has used an operation button 3103. If the print start request is input in step S56, the process advances to step S50 to execute the above-described process. Note, if a command other than a print request is designated in step S50, a corresponding process is implemented, but FIG. 13 does not illustrate this process.

If the response content is not "NotExecuted" in step S51, the process advances to step S57 to determine whether the content is "NotSupported". If the content is "NotSupported", the process advances to step S58. Since the previously issued "StartJob" instruction is not supported by the PD printer 1000, for example, (impossible designation) is displayed on the UI of the display unit 2700 so as to represent that the command is not supported by the PD printer 1000. The meaning of not supporting the "StartJob" instruction includes a case in which the PD printer 1000 does not support the "StartJob" instruction itself, and also a case in which the PD printer 1000 supports the "StartJob" instruction itself but does not support the currently issued "StartJob" instruction because an unsupported paper size or paper type (no-supported items) is designated. In this case, unsupported print conditions can be excluded by reconstructing the UI so as to disable selection of an improper paper size or paper type, similar to the above-described example. This can decrease the possibility of receiving "NotSupported" again from the PD printer 1000 when a "StartJob" instruction is issued again. At this time, a process of, e.g., confirming a paper size or paper type supported by the PD printer 1000 may be done. After the UI has been changed in this manner, the process advances to step S55 to wait for the next instruction input, and shifts to a corresponding process.

If the response content is not "NotSupported" in step S57, the process advances to step S59. This assumes that the response is substantially "OK". In step S59, it is determined whether a predetermined status notification "NotifyDeviceStatus" is sent from the PD printer 1000 within a predetermined time period. Assume that the PD printer 1000 accepts only one print job. If a "StartJob" instruction as a print start request is issued, "newJobOK" of "NotifyDeviceStatus" representing that the PD printer 1000 cannot accept the next print job must represent "False". For this reason, if a predetermined status response corresponding to the print start request is received in step S59, the process advances to step S63 to continue the normal operation, and then completes the operation.

If no predetermined status information is received within the predetermined time period in step S59, the process advances to step S60 to issue "GetDeviceStatus" to the PD printer 1000 and acquire the status of the PD printer 1000.

If a response from the PD printer 1000 is received in step S61, the process advances to step S62 to determine whether the acquired status is an estimated status corresponding to the command issued immediately before acquisition and the response. If YES in step S62, the process advances to step S63 to perform a normal process. If not estimated status has been acquired, the process advances to step S64 to execute a process corresponding to the status.

An example of "an estimated status corresponding to the response" in the fifth embodiment is a status which means "printing" as a result of issuing "GetDeviceStatus" when no "NotifyDeviceStatus" is sent for a predetermined time period though a print start request is issued in step S50 to receive "OK". In this case, a normal process can be continued on the assumption that issuing of "NotifyDeviceStatus" delays due to any reason (e.g., a long time is taken to transfer an image file). As a different status in the fifth embodiment, a status which does not mean "printing" may be sent back in response to issuing of "GetDeviceStatus". In this case, various cases are conceivable: a print start request is not normally processed due to any reason, or print is canceled due to the circumstance of the PD printer 1000 within a very short time elapsed after the print start request was issued. These reasons should be combined with another status information (e.g., error information) to determine a subsequent process. Also, concurrent use of the arrangement according to the third embodiment can realize a stabler direct print process.

In the fifth embodiment, the request issuing timing is changed depending on the process on the image data supply side. More specifically, the image supply device (camera) issues a predetermined command to the recording apparatus (printer). After the image supply device issues the predetermined command, it determines whether a signal received from the recording apparatus is a predetermined command response. If the image supply device determines that the signal is not the predetermined command response, the image supply device changes the issuing timing when issuing the next command.

However, the present invention can also be applied to an apparatus or recording apparatus which receives image data. More specifically, the apparatus or recording apparatus which receives image data issues a predetermined command to the image supply device. After the apparatus or recording apparatus issues the predetermined command, it determines whether a signal received from the image supply device is a predetermined command response. If the apparatus or recording apparatus determines that the signal is not the predetermined command response, the apparatus or recording apparatus which receives image data changes the timing of issuing the next command.

Sixth Embodiment

The above embodiments have mainly described processes in the DSC 3012. The sixth embodiment will explain a process when the PD printer 1000 acquires image data from the DSC 3012. The hardware arrangement in the sixth embodiment is the same as that in the first embodiment, and a description thereof will be omitted.

Figure 14:
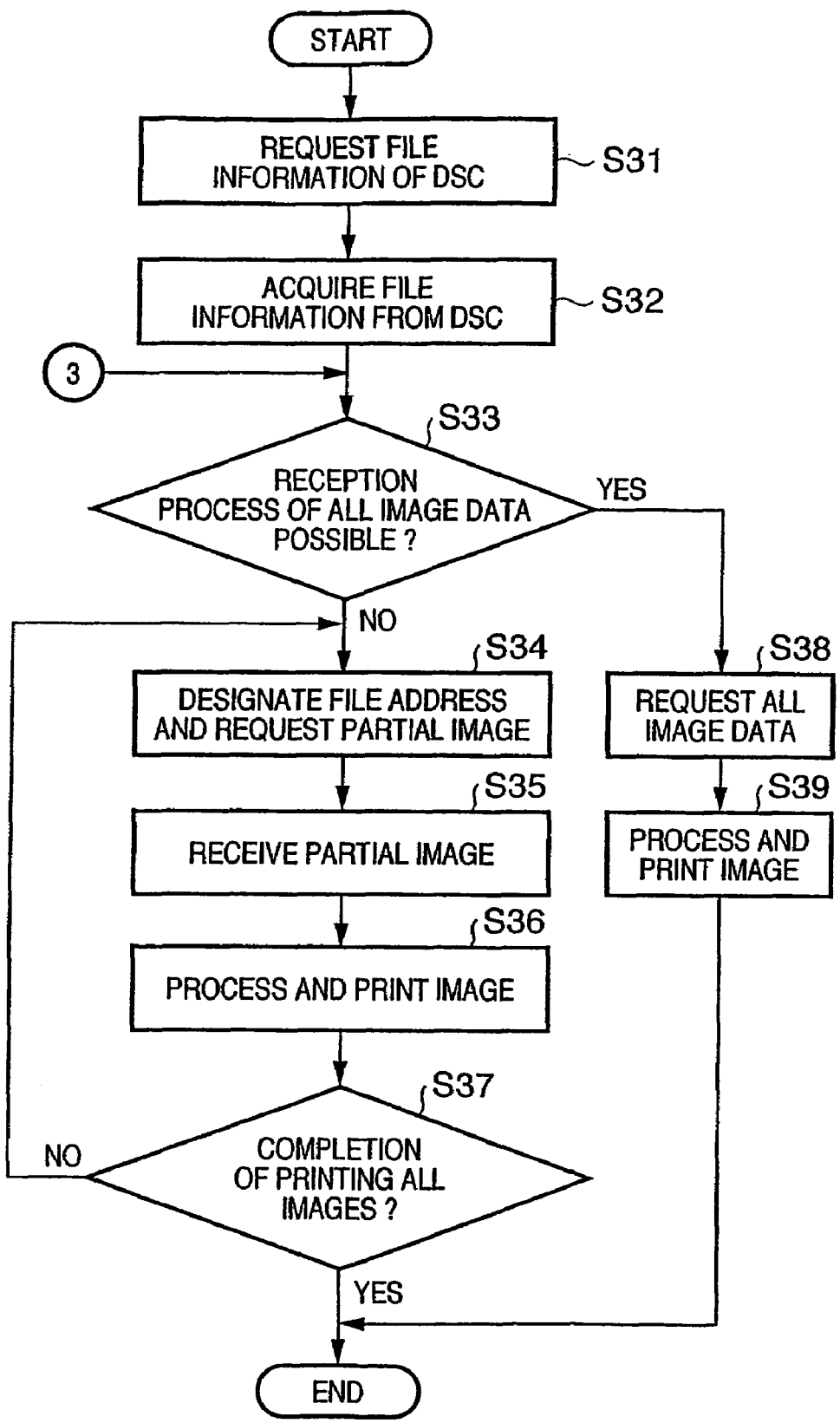
FIG. 14 is a flow chart for explaining a process by a PD printer according to the sixth embodiment.

FIG. 14 is a flow chart for explaining an image data acquisition process in the PD printer 1000 according to the sixth embodiment of the present invention. A program which executes this process is stored in the program memory 3003*a*, and executed under the control of the DSP 3002.

This process starts when a print request ("StartJob") is sent from the DSC 3012 to designate the start of a print process. In step S31, "GetFileInfo" is sent to the DSC 3012 to request information on an image file desired by the DSC 3012. In step S32, when information (file size, attribute, or the like) on the image file is sent from the DSC 3012, an item which is contained in the information and represents the file capacity is acquired. The process advances to step S33 to determine whether the entire image file can be received and processed at once. This is determined on the basis of, e.g., the memory capacity of a free area in the memory 3003 of the PD printer 1000. If reception of all image data at once is determined to be impossible, the process advances to step S34 to read out the image file. A start address and read amount are designated to request partial image data of the image file. This is performed using "GetPartialFile". The DSC 3012 reads out the designated partial image data from the image file in accordance with the start address and read amount, and transmits the partial image data to the PD printer 1000. The PD printer 1000 which has received the partial image data in step S35 processes and prints the partial image data in step S36. The process advances to step S37 to determine whether all image data of the image file have been printed. If NO in step S37, the process returns to step S34 to request the next partial image data. This process is repetitively executed until the entire image file designated in step S32 has been received and printed.

If it is determined in step S33 that image data of the image file can be received and processed at once, the process advances to step S38 to request all the data of the image file of the DSC 3012. In step S39, all the image data of the image file sent from the DSC 3012 on the basis of the request are received and printed.

Figure 15:
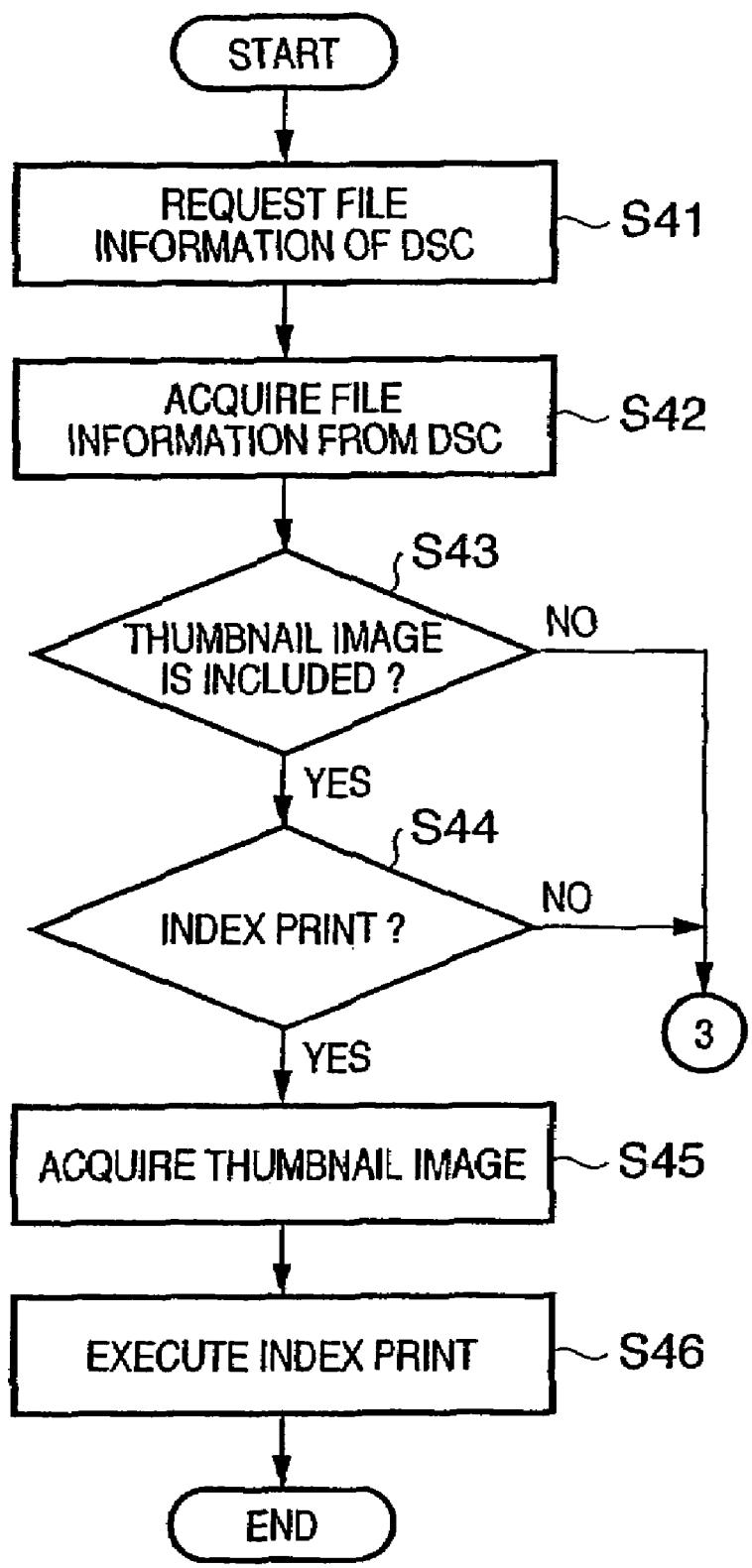
FIG. 15 is a flow chart for explaining another process by the PD printer according to the sixth embodiment.

FIG. 15 is a flow chart for explaining another example of the image data acquisition process in the PD printer 1000 according to the sixth embodiment of the present invention. A program which executes this process is stored in the program memory 3003*a*, and executed under the control of the DSP 3002.

This process starts when a print request ("StartJob") is sent from the DSC 3012 to designate the start of a print process. In step S41, "GetFileInfo" is sent to the DSC 3012 to request information on an image file designated by the DSC 3012. In step S42, if information on the image file is sent from the DSC 3012, the process advances to step S43 to determine whether the image file contains thumbnail images (index images). If the image file contains thumbnail images, the process advances to step S44 to determine whether index print is designated using the control unit 1010. If index print is designated, the process advances to step S45 to request the thumbnail image data of the DSC 3012 (issue "GetThumb") and acquire the data. The process advances to step S46 to execute index print on the basis of the acquired thumbnail image data.

If the image file does not contain any thumbnail image in step S43 or no index print is designated in step S44, the process advances to step S33 (FIG. 14) to execute the above-described image print process.

In this fashion, according to the sixth embodiment, the image data amount acquired at once from the DSC 3012 can be changed and input from the DSC 3012 in accordance with the memory capacity and process performance of the PD printer 1000.

It can be detected in advance that a thumbnail image has already been stored in the image file of the DSC 3012. When index print is designated in the PD printer 1000, a thumbnail image creation process in the PD printer 1000 can be omitted. Thus, a thumbnail image (index image) can be quickly printed.

The present invention may be applied to a system including a plurality of devices (e.g., a host computer, interface device, reader, and printer) or an apparatus (e.g., a copying machine or facsimile apparatus) formed from a single device.

The object of the present invention is also achieved when a storage medium (or recording medium) which stores software program codes for realizing the functions of the above-described embodiments (processes performed on the camera side and various print processes performed on the printer side) is supplied to a system or apparatus, and the computer (or the CPU or MPU) of the system or apparatus reads out and executes the program codes stored in the storage medium. In this case, the program codes read out from the storage medium realize the functions of the above-described embodiments, and the storage medium which stores the program codes constitutes the present invention. The functions of the above-described embodiments are realized when the computer executes the readout program codes. Also, the present invention includes a case in which the functions of the above-described embodiments are realized when an OS (Operating System) or the like running on the computer performs part or all of actual processing on the basis of the instructions of the program codes.

Furthermore, the present invention includes a case in which, after the program codes read out from the storage medium are written in the memory of a function expansion card inserted into the computer or the memory of a function expansion unit connected to the computer, the CPU of the function expansion card or function expansion unit performs part or all of actual processing on the basis of the instructions of the program codes and thereby realizes the functions of the above-described embodiments.

As has been described above, according to the embodiments, when a print process in a printer is interrupted by disconnecting a cable which connects a DSC and the PD printer, and after then print process can be restarted by connecting the cable again, the print process can be reliably restarted to print.

Image data resent from the DSC to the printer is changed at the restart of print in accordance with either a print process based on a DPOF file or a print process of image data sequentially transmitted from the DSC to the printer. In either case, print can be reliably restarted.

When the DSC according to the embodiments issues a command such as StartJob or AbortJob to the printer, the DSC estimates that a predetermined state has been set even without any response from the printer, and can decide the next operation. The DSC further issues a command for confirming the status to the printer, and can identify the current state (status) of the printer.

When the PD printer sends back a specific status as a response to the DSC, the DSC shifts to a corresponding process. For example, for "NotExecuted" or "NotSupported", the DSC issues a command which inquires the state of the printer for the former command, and decides the next command to be issued on the basis of the response. For the latter command, a previously issued command is not supported by the printer, and thus the DSC executes a process of, e.g., changing a UI displayed on the display unit so as not to subsequently issue the same command. This can prevent resending of a wasteful command to the printer.

Also when the PD printer and DSC almost simultaneously issue commands, both or at least one of the devices inhibits issuing of a command for a predetermined time period. This can decrease the possibility of almost simultaneously issuing commands from the two devices again.

According to the embodiments, the image data amount acquired at once from the DSC can be adjusted in accordance with the memory capacity or process performance of the printer. Image data can be loaded, processed, and printed.

The present invention is not limited to the above embodiments and various changes and modifications can be made within the spirit and scope of the present invention. Therefore, to apprise the public of the scope of the present invention, the following claims are made.

The invention claimed is:

1. An image supply device used in a recording system in which the image supply device and a recording apparatus communicate with each other via a communication interface, and image data is transmitted from the image supply device to the recording apparatus and recorded, wherein the recording apparatus gives priority to processing a command received from the image supply device even if the recording apparatus waits for a response from the image supply device, the image supply device comprising:

command issuing means for issuing a predetermined command to the recording apparatus;

reception means for receiving a signal from the recording apparatus after said command issuing means issues the predetermined command;

determination means for determining whether or not the signal received by said reception means is a response to the predetermined command, in a case that said reception means receives the signal while waiting for the response to the predetermined command issued by said command issuing means; and control means for discarding the signal and for inhibiting issuance, for a predetermined time period, of a next command following the predetermined command to the recording apparatus while waiting for the response to the predetermined command, in a case where said determination means determines that the signal is not the response to the predetermined command.

2. The image supply device according to claim 1, wherein the predetermined time period is changed at random.

3. The image supply device according to claim 1, wherein the predetermined time period is updated every time said determination means determines that said reception means receives the command other than the response prior to a reception of the response.

4. A recording apparatus used in a recording system in which an image supply device and the recording apparatus communicate with each other via a communication interface, and image data is transmitted from the image supply device to the recording apparatus and recorded, wherein the image supply device discards a signal received other than a response from the recording apparatus while waiting for the response from the recording apparatus, the recording apparatus comprising:

command issuing means for issuing a predetermined command to the image supply device;

reception means for receiving a signal from the image supply device after said command issuing means issues the predetermined command;

determination means for determining whether or not the signal received by said reception means is a command other than a response to the predetermined command, in a case that said reception means receives the signal while waiting for the response to the predetermined command issued by said command issuing means; and control means for giving priority to processing the command received from the image supply device, sending a response to the command to the image supply device after completion of the processing of the command, and controlling a timing of reissuing the predetermined command to the image supply device after sending of the response to the command, in a case where said determination means determines that the signal is the command other than the response.

5. The recording apparatus according to claim 4, wherein said control means delays the timing of reissuing the predetermined command by a predetermined time period.

6. The recording apparatus according to claim 5, wherein the predetermined time period is changed at random.

7. The recording apparatus according to claim 5, wherein the predetermined time period is updated every time said determination means determines that said reception means receives the command other than the response prior to a reception of the response.

8. A control method of an image supply device used in a recording system in which the image supply device and a recording apparatus communicate with each other via a communication interface, and image data is transmitted from the image supply device to the recording apparatus and recorded, wherein the recording apparatus gives priority to processing a command received from the image supply device even if the recording apparatus waits for a response from the image supply device, the method comprising:

a command issuing step of issuing a predetermined command to the recording apparatus;

a reception step of receiving a signal from the recording apparatus after the predetermined command is issued in said command issuing step;

a determination step of determining whether or not the signal received in said reception step is a response to the predetermined command in a case that said reception step receives the signal while waiting for the response to the predetermined command issued by said command issuing step; and a control step of discarding the signal and inhibiting issuance, for a predetermined time period, of a next command following the predetermined command to the recording apparatus while waiting for the response to the predetermined command, in a case where it is determined in said determination step that the signal is not the response to the predetermined command.

9. The method according to claim 8, wherein the predetermined time period is changed at random.

10. The method according to claim 8, wherein the predetermined time period is updated every time it is determined in said determination step that the command other than the response corresponding to the predetermined command has been received prior to a reception of the response in said reception step.

11. A control method of a recording apparatus used in a recording system in which an image supply device and the recording apparatus communicate with each other via a communication interface, and image data is transmitted from the image supply device to the recording apparatus and recorded, wherein the image supply device discards a signal received other than a response from the recording apparatus while waiting for the response from the recording apparatus, the method comprising:

a command issuing step of issuing a predetermined command to the image supply device;

a reception step of receiving a signal from the image supply device after the predetermined command is issued in said command issuing step;

a determination step of determining whether or not the signal received in said reception step is a command other than a response to the predetermined command, in a case that said reception step receives the signal while waiting for the response to the predetermined command issued by said command issuing step; and a control step of giving priority to processing the command received from the image supply device, sending a response to the command to the image supply device after completion of the processing of the command, and controlling a timing of reissuing the predetermined command to the image supply device after sending of the response to the command, in a case where it is determined in said determination step that the signal is the command other than the response.

12. The method according to claim 11, wherein in said control step, the timing of reissuing the predetermined command is delayed by a predetermined time period.

13. The method according to claim 12, wherein the predetermined time period is changed at random.

14. The method according to claim 12, wherein the predetermined time period is updated every time it is determined in said determination step that the command other than the response corresponding to the predetermined command has been received prior to a reception of the response in said reception step.

* * * * *

UNITED STATES PATENT AND TRADEMARK OFFICE
CERTIFICATE OF CORRECTION

PATENT NO. : 7,289,141 B2
APPLICATION NO. : 10/541381
DATED : October 30, 2007
INVENTOR(S) : Akitoshi Yamada et al.

It is certified that error appears in the above-identified patent and that said Letters Patent is hereby corrected as shown below:

COLUMN 2
Line 1, "provided with" should read --provided--.
Line 18, "provided with" should read --provided--.

COLUMN 6
Line 47, "Dvice Status" should read --Device Status--.

COLUMN 7
Line 66, "generation" should read --generation of--.

COLUMN 8
Line 30, "interrupted," should read --been interrupted,--.

COLUMN 13
Line 14, "statue" should read --status--.
Line 47, "statue" should read --status--.

Signed and Sealed this

Tenth Day of March, 2009

JOHN DOLL
*Acting Director of the United States Patent and Trademark Office*